United States Patent [19]

Mellits et al.

[11] Patent Number: 5,187,974
[45] Date of Patent: Feb. 23, 1993

[54] VEHICULAR PRESSURE-TESTING APPARATUS

[75] Inventors: Kirk E. Mellits, Racine; Robert D. Braun; Gary S. Wollert, both of Kenosha, all of Wis.

[73] Assignee: Snap-on Tools Corporation, Kenosha, Wis.

[21] Appl. No.: 751,757

[22] Filed: Aug. 29, 1991

[51] Int. Cl.⁵ .............................................. G01M 3/26
[52] U.S. Cl. ........................................ 73/49.7; 73/40
[58] Field of Search ................. 73/49.7, 99.5, 119, 73/47, 40, 49.1

[56] References Cited

U.S. PATENT DOCUMENTS

| | | | |
|---|---|---|---|
| 3,874,225 | 4/1975 | Fegel | 73/40 |
| 4,574,620 | 3/1986 | Cohl | 73/49.7 X |
| 4,766,765 | 8/1988 | Ezekoye | 73/46 X |
| 5,020,362 | 6/1991 | Hart | 73/49.7 X |

OTHER PUBLICATIONS

OTC Table of Contents, pp. 7, 43.
Kent-Moore catalog cover, pp. 8, 15, 17.
Mac cover, p. 315.
Photograph of Borroughs vehicular pressure-testing apparatus.

Primary Examiner—Hezron E. Williams
Assistant Examiner—Wayne Simms
Attorney, Agent, or Firm—Emrich & Dithmar

[57] ABSTRACT

The pressure-testing apparatus comprises a manifold having a pair of conduits extending therefrom and being substantially parallel. Quick connectors at the free ends of the conduits have receptacles the axes of which are substantially parallel. A pair of adapters are respectively attached to the fittings of a broken coupler in a vehicle. The quick connectors are respectively applied to the adapter elements. The apparatus also comprises a pressure gauge on the manifold and/or means on the manifold for connection to a gauge.

15 Claims, 2 Drawing Sheets

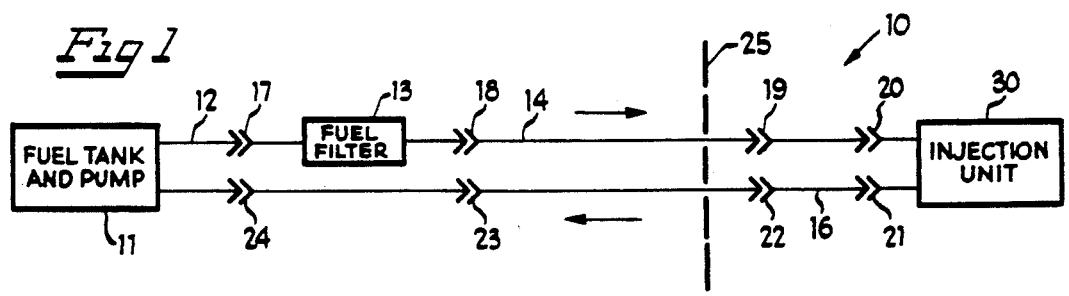
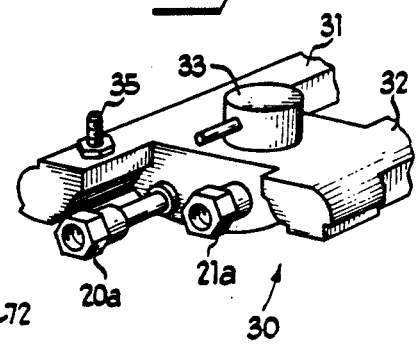
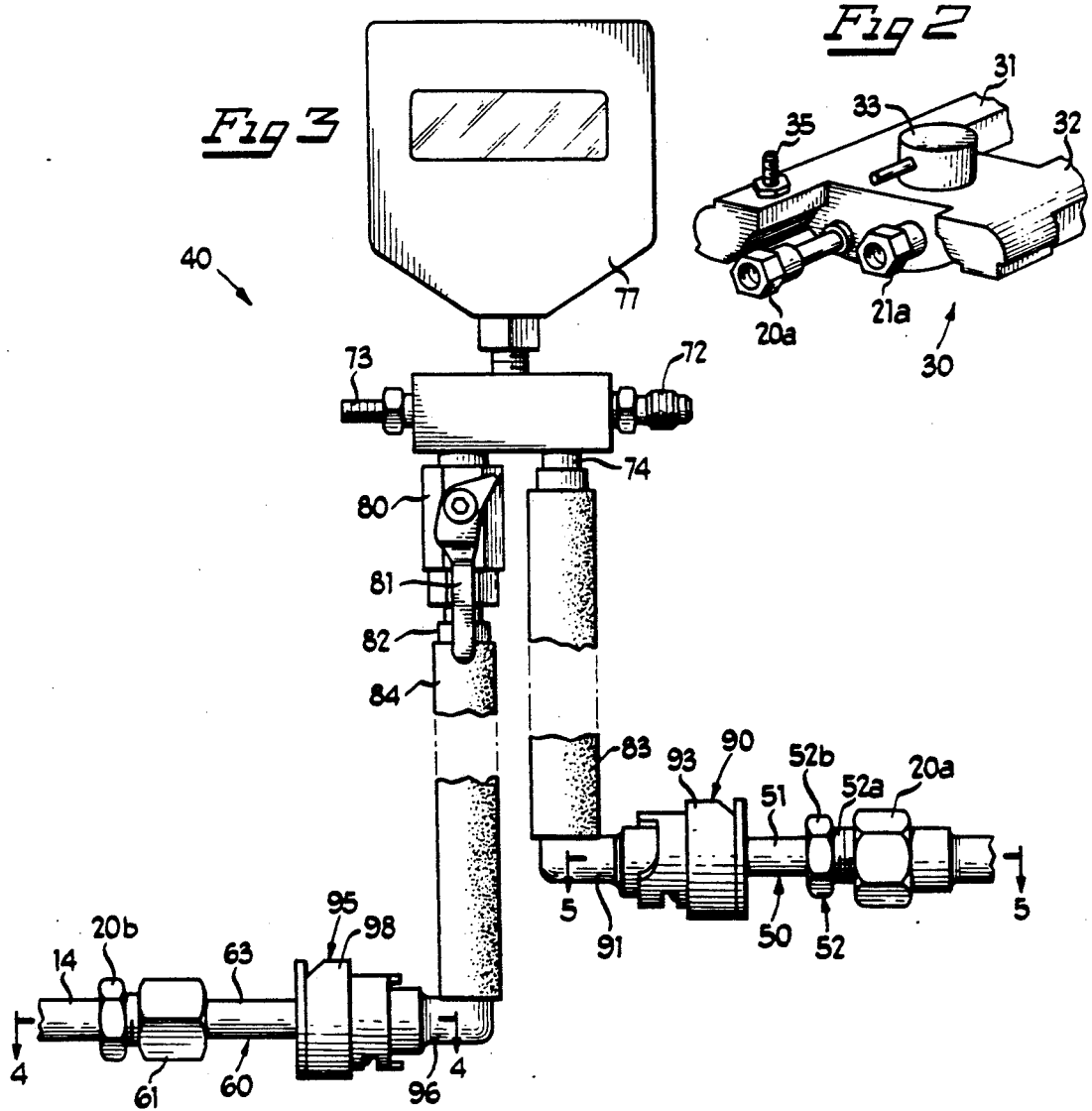

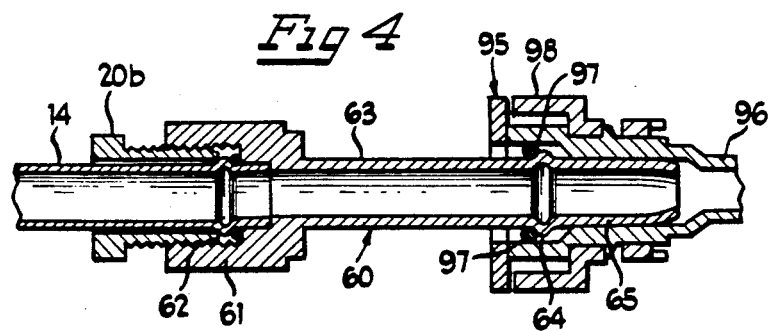
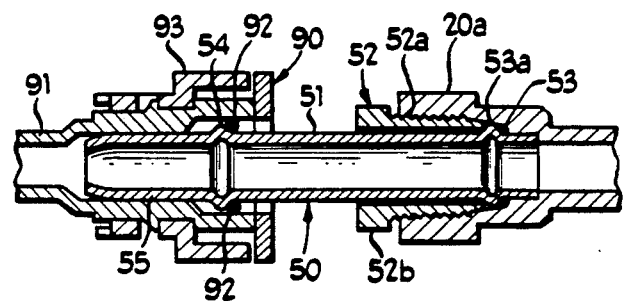
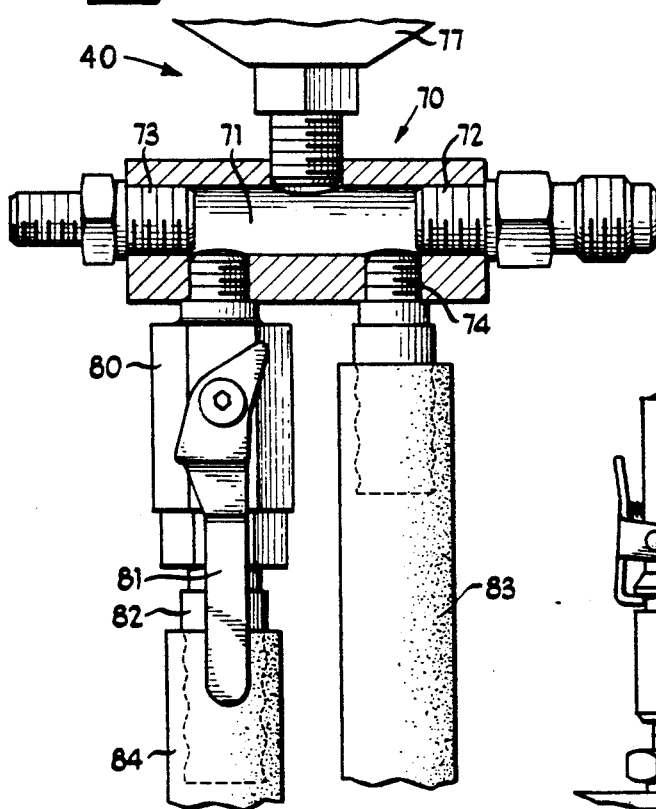

5,187,974

VEHICULAR PRESSURE-TESTING APPARATUS

BACKGROUND OF THE INVENTION

The fuel-delivery system in a vehicle, such as an automobile, includes a fuel tank, a fuel pump, a filter and an injection unit which has a set of injectors that spray the fuel into the manifold/cylinders. There are two basic types of injection units currently in use. A single-point or throttle-body injection unit has one or two injectors which spray the fuel into the manifold. A multi-port injection unit has at least one injector per cylinder. A line couples the fuel pump to the injection unit. There is also a return line from the injection unit back to the tank. There are couplers in the lines at selected points, as well as couplers between the lines and the pump, the tank and the injection unit.

In order to test the components of the fuel-delivery system, namely, the pump, the injectors, the regulator associated with the injection unit, the filter, the lines and/or the couplers, mechanics commonly use a pressure-testing apparatus that can be inserted into the system. Such apparatuses inform the mechanic of the pressure at selected points in the system. The amount of the pressure, as well as variations thereof, will inform the mechanic of defects in the fuel-delivery system. For example, the pressure may indicate that the fuel pump is defective or an injector or the regulator are leaking or there is a leak in a line or in a coupler.

Apparatuses of this type currently in the marketplace comprise adapters which are applied to a selected point in the fuel system. The adapters are installed with a wrench. Such an apparatus includes additional components which must be assembled and then attached to the adapters also using tools. When the mechanic has determined the pressure, he must reverse the steps, detaching the apparatus from the adapters and the adapters from the fuel system. Sometimes it is necessary to install the testing apparatus at a different point in the fuel system or simply reverse the apparatus. Either action requires detaching the adapters, detaching the rest of the mechanism from the adapters, both with the use of tools, coupling different adapters at the selected point in the fuel system and then reattaching the rest of the testing apparatus.

The couplers of other vehicles are likely to have different constructions and, in order to apply the pressure-testing apparatus, each of them require different adapters and different components to connect to the adapters. Each time an adapter is applied, tools are necessary and each time the balance of the testing apparatus is attached, tools are again required.

These testing apparatuses are also useable to deliver solvents to the injection unit for use in cleaning the injectors. But, the need for tools, again, to attach the adapters and the rest of the apparatus is undesirable.

Certain fuel-injection units include a testing port to which the testing apparatus may be applied. Current pressure-testing apparatuses can be used with the port, but they suffer similar disadvantages as those described above. An adapter is applied to the port using tools and then the balance of the testing apparatus is attached to the adapter.

SUMMARY OF THE INVENTION

It is, therefore, an important object of the present invention to provide a pressure-testing apparatus which comprises adapters that are applied to selected points in the vehicular fuel system to which the rest of the testing apparatus can be applied without the use of tools.

Another object is to provide a pressure-testing apparatus including a set of adapters to be used with various vehicles and at various points in a vehicle, each adapter having an identical element to which is applied a quick connector on the rest of the testing apparatus.

Another object is to reduce the extent to which tools are necessary to use a pressure-testing system.

Another object is to be able to clean the injectors and other parts of the fuel system with the same, simple-to-apply testing apparatus.

In summary, there is provided pressure-testing apparatus for a vehicular fuel system which includes an injection unit, a tank unit, a pump unit, fuel lines between these units, and a plurality of couplers between the lines and the associated units and/or in the lines, the testing apparatus being adapted to be applied to a selected coupler which has been disconnected or broken, the testing apparatus comprising a pair of adapters for respectively attaching to the broken coupler, a manifold having at least three ports, a pair of conduits respectively coupled to two of the ports, the third of the ports being adapted for connection to a pressure gauge, and a pair of quick connectors attached respectively to the conduits, the quick connectors having means for respective application to the adapters.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 1 is a block diagram of a vehicular fuel system which may be tested and cleaned using the testing apparatus which incorporates the features of the present invention;

FIG. 2 is a fragmentary, perspective view of one end of a multi-port fuel-injection unit;

FIG. 3 depicts a testing apparatus incorporating the features of the present invention, connected at a selected point in the fuel system of FIG. 1;

FIG. 4 is a view in section on an enlarged scale taken along the line 4—4 of FIG. 3;

FIG. 5 is a view in section on an enlarged scale taken along the line 5—5 of FIG. 3;

FIG. 6 is an enlarged view in section of the manifold of FIG. 3; and

FIG. 7 is a view of an adapter mounted on the test port of a fuel-injection unit.

DETAILED DESCRIPTION OF THE PREFERRED EMBODIMENT

Referring now to the drawings and more particularly to FIG. 1 thereof, there is depicted a typical vehicular fuel-delivery system 10. It includes a fuel tank 11 with which is associated with a fuel pump. The outlet of tank 11 is coupled by way of a feed line 12 to a fuel filter 13, and then from there via a line 14 to the inlet of an injection unit 30. A line 16 provides a return path for fuel from unit 30 back to fuel tank 11. In fuel line 12 is a coupler 17, line 14 has three couplers 18, 19 and 20, and return line 16 has four couplers 21-24. Each coupler has two detachable elements, one being represented by the head of an arrow and the other represented by the tail. The number of couplers and their locations are meant to be representative. Fuel tank 11, fuel filter 13 and couplers 17, 18, 23 and 24 are usually at the rear of the vehicle, injection unit 30 and couplers 20 and 21 are in the engine. Couplers 19 and 22 may be located in the engine compartment just beyond the firewall 25. Commonly, one or more of couplers 17-24 may include a quick connector and an adapter element which is received in such quick connector.

One of the ways to diagnose fuel system 10 is to test the pressure at a selected point. The present testing apparatus permits breaking any of couplers 17-24. Also certain injector units have a test port, as will be described, to which the testing apparatus can be applied. One element of some of the couplers may be part of the structure to which the line is connected rather than being in the line. For example, one element of coupler 20 may be a fitting on injection unit 30 as may one element of coupler 21.

FIG. 2 depicts an exemplary injection unit 30 of the multi-port type. Unit 30 includes two rails 31 and 32 and a regulator 33 therebetween. A plurality of injectors (no shown) is carried by rails 31 and 32, and they spray fuel into the cylinders (not shown) of the engine. Unit 30 includes an input fitting 20a and an output fitting 21a. Fuel is applied through rails 31 and 32 into the injectors and unused fuel exits injection unit through fitting 21a. Unit 30 includes a test port or fitting 35.

Referring to FIGS. 3-5, testing apparatus 40 comprises adapters 50 and 60. Adapter 50 includes a tube 51 and a slip nut 52 thereon. Nut 52 has a threaded portion 52a to match the threads of the recess of fitting 20a and has a wrenching formation 52b. One end of tube 51 carries an O-ring 53 held in place by a lip 53a. Closer to the other end of tube 51 and formed integral therewith is a circumferential lip 54. The portion of tube 51 from such other end to just beyond lip 54 defines an adapter element 55. Adapter 60 is of one-piece construction, in the embodiment shown, and includes a body 61 of relatively large diameter having a threaded recess 62. The exterior surface of body 61 is hexagonal enabling a wrench to grip same. The inner end of body 61 merges into a tube 63. Closer to the free end of tube 63 and formed integral therewith is a circumferential lip 64. The portion of tube 63 from such free end to just beyond lip 64 defines an adapter element 65. Adapter elements 55 and 65 are substantially identical in construction.

Referring to FIG. 6, testing apparatus 40 further comprises a manifold 70 which, in the embodiment depicted, is a piece of solid brass of parallelepiped shape. Manifold 70 has a bore 71 therethrough, the ends of which are threaded to receive nipples 72, 73, each of which preferably incorporates a check valve. Manifold 70 has three additional threaded bores all communicating with bore 71 and being parallel to each other. Disposed in two of the bores on the same side of manifold 70 are a nipple 74 and the threaded end of an in-line valve 80. Into the third additional bore, located on the other side of manifold 70, is threaded a digital pressure gauge 77.

Valve 80 has an on/off lever 81 and a nipple 82 threaded into the outer end thereof. A conduit 83 extends from nipple 74 and a conduit 84 extends from nipple 82. Conduits 83 and 84 are preferably identical in length and are composed of nylon or other material through which fuel can flow.

Referring to FIGS. 3-5, testing apparatus 40 further comprises a pair of quick connectors 90 and 95 which may be composed of plastic. Connector 90 includes an elbow 91, one leg of which is inserted into the outer end of conduit 83 and the other leg of which extends laterally, is enlarged and has a recess through which a pair of parallel pins 92 reside. These pins are carried by a knob 93 rotatably mounted on the laterally extending leg of elbow 91. Knob 93 is loaded by a spring (not shown) so that such knob places pins 92 relatively close together. Knob 93 may be rotated clockwise or counter-clockwise to spread the pins. Connector 95 is identical to connector 90, including an elbow 96, pins 97 and a knob 98. The axes of the laterally extending legs of connectors 90 and 95 are substantially parallel. In the preferred embodiment, conduits 83 and 84 are substantially identical, whereby connector 95 is offset outwardly from connector 90.

To evaluate the pressure in fuel system 10, coupler 20, for example, is broken, exposing fittings 20a and 20b which make up that coupler. Adapter 50 is attached to fitting 20a. Specifically, the end of tube 51 with O-ring 53 is inserted into fitting 20a and a wrench is used to tighten slip nut 52 into the recess of fitting 20a. Adapter element 55 protrudes outwardly from fitting 20a. Adapter 60 is installed with the use of a wrench on fitting 20b by rotating body 61 thereon. Connector 90 is applied to adapter 50 by pushing connector 90 onto element 55 (which automatically spreads pins 92) until the tip of element 55 is deep within elbow 91. Knob 93 is released, whereupon pins 92 move toward each other, capturing lip 54 within connector 90. Connector 95 is applied to adapter 60 in the same way.

Gauge 77 will display the pressure in line 14 (FIG. 1). When the mechanic has completed his measurements, he merely rotates knob 93 to move pins 92 outwardly so that connector 90 may be withdrawn from adapter 50. Similarly, knob 98 is rotated to remove it from adapter 60. A wrench is then used to remove adapters 50 and 60. Thus, while adapters 50 and 60 are installed and removed with tools, installation and removal of the rest of the testing apparatus is effected without the use of tools. This is of particular importance when the mechanic wants to make measurements at other points in the fuel system, such as any one of couplers 17-24.

With testing apparatus 40 connected as shown in FIG. 3, valve 80 is upstream of gauge 77. The fuel pump is energized to pressurize fuel system 10 (FIG. 1), and then lever 81 is moved from its open position depicted in FIG. 3 to its closed position, thereby trapping pressure between valve 80 and injection unit 30. Then the fuel pump is turned off. A mechanic monitors gauge 77. The pressure level should remain relatively constant. If the pressure begins to drop, that indicates a leaking injector or a leaking regulator. Then an adapter may be installed in coupler 21 of return line 16 and a plug mounted thereon. This overrides the regulator. Such adapter may have an adapter element identical to elements 55 and 65. If there is still a pressure drop indicated, the leak is in an injector.

Other tests can be made by reversing apparatus 40, that is, quick connectors 90 and 95 are detached from adapters 50 and 60. Quick connector 90 is applied to adapter 60 and quick connector 95 is applied to adapter 50. Then, gauge 77 is upstream of valve 80. The engine is turned on to energize the fuel pump and pressure the fuel system. Valve 80 is then placed in its closed condition, after which the engine is turned off. Pressure between the fuel pump and valve 80 should rise and be maintained. The mechanic monitors gauge 77. If the pressure does not rise and is not maintained, he knows that the fuel pump is defective.

Thus, the mechanic can test the fuel pump and/or the filter with the testing apparatus in one orientation and test for leaking injectors or a leaking regulator with the testing apparatus in a reverse orientation. Change in the orientation of apparatus 40 is simply and quickly done by the mechanic because of the use of the quick connectors 90 and 95 in conjunction with adapters 50 and 60.

Apparatus 40 can also be used to clean the injectors. Tubing from a can of solvent (not shown) can be coupled to either of nipples 72 or 73. Preferably, valve 80 is closed to prevent back flow of the solvent into the fuel tank. Solvent passes through adapter 50 into injection unit 30, then into the injectors (not shown) for cleaning thereof.

Apparatus 40 may also be used with a remote pressure gauge instead of gauge 77. Such remote gauge is coupled by means of tubing to nipples 72 or 73 depending upon configuration of the fitting on the tubing.

Instead of apparatus 40 being supplied with gauge 77 as a part thereof, it may be supplied without such gauge and the associated port plugged. A pressure gauge is coupled to a selected one of nipples 72 or 73. Although gauge 77 is preferably digital as depicted in FIG. 3, it can be analog.

The particular design of apparatus 40 makes it easy for the mechanic to use. After the selected coupler is broken, because the two quick connectors 90 and 95 have generally parallel axes, although slightly offset, and because conduits 83 and 84 are generally parallel, quick connectors 90 and 95 will be in convenient position to be installed on adapters 50 and 60. No manipulation or bending of conduits 83 and 84 is necessary.

Testing apparatus 40 further comprises an adapter 100 which can be used with test port 35. Referring to FIG. 7, adapter 100 includes a threaded barrel 101 and an elbow 102 snap fitted onto barrel 101, barrel 101 and elbow 102 being off-the-shelf devices. Adapter 100 also includes a tube 103 having one end portion permanently attached to elbow 102. The portion of tube 103 from the other end to just beyond a circumferential lip 104 constitutes an adapter element 105 identical in construction to adapter elements 55 and 65. Thus, quick connectors 90 or 95 can be applied to adapter element 105. For those engines having an injection unit 30 with a built-in test port, an initial pressure diagnosis is made by applying either of quick connectors 90 or 95 to adapter element 105. A safety plug is preferably applied to the remaining quick connector for safety reasons. Pressure is monitored by the mechanic. Out-of-range pressure signifies a problem in the fuel system. Additional testing would be in order to further identify the problem. Even when a built-in test port is provided, teeing in, as depicted in FIG. 3, may be desirable to test the various structures of the fuel system.

FIG. 3 depicts use of the testing apparatus 40 at coupler 20. The testing apparatus can, however, be used at any of couplers 17-24 depending upon which ones are accessible. One or more of these couplers may have different configurations. A pair of adapters would have to be provided for each such configuration if it is desired to tee in to the corresponding point. However, each adapter would have an adapter element identical to adapter elements 55 and 65 and the portions corresponding to elements 51-53 or 61-63 would be different and would correspond to the particular coupler. Similarly, different automobiles have different couplers. Again, the adapter set would include a plurality of adapter pairs each one with an adapter element identical to elements 55 and 65, but with the other portion being of a configuration to match the associated coupler element.

What has been described, therefore, is an improved pressure-testing apparatus which comprises sets of pairs of adapters each having an identical element thereon for use in interconnecting with a quick connector on the testing apparatus to facilitate attachment and detachment thereof to various testing points in a vehicular fuel system and in the testing points of fuel systems of various vehicles.

What is claimed is:

1. Pressure-testing apparatus for a vehicular fuel system which includes an injection structure, a tank structure, a pump structure, fuel lines between these structures, and a plurality of couplers interconnecting the fuel lines and the associated structures, said testing apparatus being adapted to be applied to a selected coupler which has been broken, said testing apparatus comprising a pair of adapters for respectively attaching to the broken coupler, a manifold having at least three ports, two conduits respectively coupled to two of said ports, two quick connectors attached respectively to said conduits, said quick connectors having means for respective application to said adapters, and a valve between one of said ports and the associated conduit.

2. The pressure-testing apparatus of claim 1, wherein said quick connectors are substantially identical.

3. The pressure-testing apparatus of claim 1, wherein said manifold has a fourth port for coupling to a pressure gauge via a further conduit.

4. The pressure-testing apparatus of claim 1, wherein and further comprising a pressure gauge coupled to the third of said ports.

5. The pressure-testing apparatus of claim 4, wherein said gauge is digital.

6. The pressure-testing apparatus of claim 1, wherein each of said conduits is composed of nylon.

7. The pressure-testing apparatus of claim 1, wherein each of said quick connectors has a receptacle, each of said adapters having a male element for insertion into the associated receptacle and having an attachment portion connected to the associated coupler.

8. The pressure-testing apparatus of claim 1, wherein said manifold is a one-piece metal body.

9. The pressure-testing apparatus of claim 8, wherein said manifold has a fourth port for coupling to a pressure gauge via a further conduit.

10. The pressure-testing apparatus of claim 1, wherein each of said conduits are substantially parallel.

11. The pressure-testing apparatus of claim 1, wherein the axes of said quick connectors are substantially parallel.

12. Pressure-testing apparatus for a number of different vehicle fuel systems which include injection structure, tank structure, pump structure, lines between these structures, and a plurality of couplers interconnecting the lines and the associated structures, said testing apparatus being adapted to be applied to a selected coupler of any of a number of vehicle fuel systems, said testing apparatus comprising a plurality of pairs of adapters respectively corresponding to the plurality of couplers, each pair of adapters being respectively designed for attaching to the broken coupler and including a corresponding pair of quick connectors, each of said adapters including an adapter element for coupling to said quick connector, a manifold having at least three ports, two conduits respectively coupled to two of said ports, the third of said ports being adapted for connection to a pressure gauge, and two quick connectors attached respectively to said conduits; said quick connectors having means for respective application to said adapters, all of said adapter elements being substantially identical.

13. The pressure-testing apparatus of claim 12, wherein each of said quick connectors includes a receptacle and each of said adapter means is male for insertion into the associated receptacle.

14. Pressure-testing apparatus for a number of different vehicle fuel systems which include injection structure, tank structure, pump structure, lines between these structures, and a plurality of couplers interconnecting the lines and the associated structures, said testing apparatus being adapted to be applied to a selected coupler of any of a number of vehicle fuel systems, the fuel injection structure of some of said vehicular fuel systems including a test port, a plurality of pairs of primary adapters respectively corresponding to the plurality of couplers, each pair of primary adapters being respectively designed for attaching to the broken coupler and including a corresponding pair of quick connectors, a test port adapter for application to said test port, each of said adapters including an adapter element for coupling to said quick connector, a manifold having at least three ports, two conduits respectively coupled to two of said ports, the third of said ports being adapted for connection to a pressure gauge, and two quick connectors attached respectively to said conduits, said quick connectors having means for respective application to said adapters, all of said adapter elements being substantially identical.

15. The pressure-testing apparatus of claim 14, wherein each of said quick connectors includes a receptacle and each of said adapter elements is male for insertion into the associated receptacle.

* * * * *

UNITED STATES PATENT AND TRADEMARK OFFICE
CERTIFICATE OF CORRECTION

PATENT NO.   :   5,187,974
DATED        :   February 23, 1993
INVENTOR(S)  :   Kirk E. Mellits et al.

It is certified that error appears in the above-identified patent and that said Letters Patent is hereby corrected as shown below:

Column 6, line 44, delete "wherein".

Column 7, line 21, "means" should be --elements--.

Signed and Sealed this

Sixteenth Day of November, 1993

Attest:

BRUCE LEHMAN

Attesting Officer

Commissioner of Patents and Trademarks